United States Patent Office 3,269,918
Patented August 30, 1966

3,269,918
PROCESS FOR THE PRODUCTION OF
PURIFIED GLUCOSE OXIDASE
Richard Russell Barton, Elkhart, Ind., assignor to Miles
Laboratories, Inc., Elkhart, Ind., a corporation of
Indiana
No Drawing. Filed Apr. 20, 1964, Ser. No. 361,251
10 Claims. (Cl. 195—66)

This invention relates to a process for the production of highly pure glucose oxidase. More particularly, it relates to a process of purifying glucose oxidase with an anionic ion-exchange material.

Glucose oxidase is an enzyme which has a large number of commercial applications. It is used for removing glucose or oxygen from various compositions and materials, such as the removal of glucose from egg whites prior to drying them. It is also used for removing oxygen from packaged, canned or bottled foods and beverages. An additional use is in diagnostic procedures and compositions for determining glucose content of body fluids, such as blood and urine. For many of these applications a highly pure glucose oxidase is not required. However, in some applications, such as diagnostic compositions, the glucose oxidase should be as free of contaminating substances as possible. Commercial glucose oxidase generally contains catalase, maltase, cellulase and non-enzymatic proteins as impurities. Various procedures have been employed in the prior art for obtaining purified glucose oxidase but none of them has been able to remove substantially all the catalase impurity, for example, while recovering substantially all of the glucose oxidase. Furthermore the prior art purification procedures were quite complicated.

It is an object of the present invention to provide a process for the production of glucose oxidase substantially free of impurities such as catalase.

It is a further object of the present invention to provide a simplified process for the production of purified glucose oxidase.

The enzyme glucose oxidase is known to be obtained upon fermentation by *Aspergillus niger, Penicillium glaucum, Penicillium notatum, Penicillium chrysogenum, Penicillium purpurogenum, Aspergillus fumaricus* and the like, of a glucose-containing substrate also containing proper nutrients for bacterial or fungal growth. The mycelium resulting from such fermentation is then filtered from the fermentation liquor. The mycelium is then broken up mechanically and the cell contents extracted with water, for example. The aqueous material thus obtained contains glucose oxidase and well known techniques can be employed to recover the glucose oxidase. Such glucose oxidase, however, is contaminated with impurities such as catalase.

In accordance with the present invention, purified glucose oxidase is obtained by a process which comprises mixing aqueous mycelium material containing glucose oxidase and impurities including catalase with ammonium sulfate to precipitate the glucose oxidase, separating the glucose oxidase precipitate from the remainder of the aqueous mycelium material, dissolving the glucose oxidase precipitate in water, contacting the resulting aqueous glucose oxidase solution with a weak anionic ion-exchange material wherein the glucose oxidase and impurities are adsorbed by the weak anionic ion-exchange material, and then selectively removing the purified glucose oxidase from the weak anionic ion-exchange material.

More particularly, purified glucose oxidase is obtained by a process which comprises mixing aqueous mycelium material containing glucose oxidase and impurities including catalase with ammonium sulfate to precipitate the glucose oxidase, said ammonium sulfate being added to the aqueous mycelium material in an amount of at least about 85 percent of saturation, separating the glucose oxidase precipitate from the remainder of the aqueous mycelium material, dissolving the glucose oxidase precipitate in water, adjusting the pH of a weak anionic ion-exchange material to about 4.5, contacting the aqueous glucose oxidase solution with said weak anionic ion-exchange material wherein the glucose oxidase and impurities are adsorbed by the weak anionic ion-exchange material, washing the weak anionic ion-exchange material containing the glucose oxidase and impurities with a buffer having a molar strength of about 0.07 to about 0.09 and a pH of about 4.3 to about 4.7 to remove adsorbed catalase and other impurities from the weak anionic ion-exchange material, and then washing the weak anionic ion-exchange material with a buffer having a molar strength of about 0.095 to about 0.11 and a pH of about 3.5 to about 3.8 to remove purified glucose oxidase from the anionic ion-exchange material.

In the preferred form of the invention, the aqueous glucose oxidase solution obtained by dissolving in water the ammonium sulfate-precipitated glucose oxidase is treated by dialysis to remove salts prior to contacting the aqueous glucose oxidase solution with the weak anionic ion-exchange material. This treatment comprises dialyzing the aqueous glucose oxidase against running water at about 5° C. to about 25° C., preferably about 10° C., until the electrical resistance of the enzyme solution is at least about 890 ohms/cm. This resistance indicates substantially complete removal of salts from the aqueous glucose oxidase solution. Such dialysis takes place in about 7–21 hours. The dialyzed liquid is then preferably adjusted to a pH of about 4.5 by addition of acid, such as acetic acid, to precipitate additional impurities. The pH adjusted liquid is then separated from the precipitated impurities and contacted with the weak anionic ion-exchange material for subsequent treatment as described above.

The various steps in the present invention wherein liquids are separated from precipitated solids can be carried out by well known techniques, such as filtration, decantation, centrifugation and the like.

The weak anionic ion-exchange materials useful in the present invention are well known and are available commercially from several sources. Typical weak anionic ion-exchange materials and their preparation are described, for example, in U.S. Patent No. 2,366,008 of G. F. D'Alelio, and U.S. Patent No. 2,591,574 of C. H. McBurney. Such materials, for example, can consist of polymerized styrene-divinylbenzene containing reactive ion-exchange sites. Other materials, such as phenol-formaldehyde resins, polystyrene, coal derivatives and cellulose which contain the proper reactive sites can be employed. In the weak anion exchange materials the reactive sites are generally primary and secondary polyamino groups, such as diethylenetriamino groups and the like. These weak anionic ion-exchange materials can be either in the base ($OH^-$) form or the salt ($Cl^-$ or $SO_4^=$) form. When the weak anionic material is at a basic pH it is in the base form. When it is neutral or at an acid pH, it is in the salt form.

Other ion-exchange materials useful in the present invention are the cellulose ion-exchangers prepared by the reaction of a chloro compound with cellulose which has previously been allowed to swell in strong alkali. In the preparation of weak anionic diethylaminoethyl cellulose (DEAE-Cellulose), for example, alkali-treated cellulose is reacted with 2-chlorotriethylamine hydrochloride. In the preparation of weak anionic epichlorohydrin-triethanolamine cellulose (ECTEOLA-Cellulose), a mixture of epichlorohydrin and triethanolamine is employed. The above mentioned cellulose ion-exchange materials are well known in the art.

Another ion-exchange material useful in the present invention employs as the substrate a polysaccharide dextran suitably cross-linked with epichlorohydrin to produce a hydrophilic solid gel characterized by a high degree of microporosity. This substrate can be treated in a manner similar to that described above for cellulose to prepare weak anionic ion-exchange materials. This substrate material is available under the trade name "Sephadex" and is marketed by Pharmacia Fine Chemicals, Inc., New York, New York. The diethylaminoethyl modified form of anionic ion-exchange material is known as "DEAE-Sephadex," for example.

Weak anion exchange materials useful in the present invention are sold under the following illustrative trade names by the indicated suppliers:

| Reactive Group | Trade Name | Supplier |
| --- | --- | --- |
| Polyamine | Duolite A-2 | Diamond Alkali Co. |
| Do | Amberlite IR-45 | Rohm and Haas Co. |
| Do | Amberlite IRA-50 | Do. |
| Do | Permutit A | The Permutit Co. |
| Do | De-Acidite | Do. |
| Do | Dowex 3 | Dow Chemical Co. |
| Do | Nalcite WBR | National Aluminate Co. |
| Ethylamine | DEAE-Selectacel (Cellulose) | Carl Schleicher and Schuell Co. |
| Epichlorohydrin triethanolamine | ECTEOLA-Selectacel (Cellulose) | Do. |

Before contacting the aqueous glucose oxidase solution with the weak anionic ion-exchange material for selective removal of catalase and other impurities from glucose oxidase, the anionic material is conditioned for use by treatment with a buffer to a pH of about 4.5. The preferred buffer employed for this purpose is a sodium acetate-acetic acid system containing 0.05 molar sodium acetate and sufficient acetic acid to obtain a pH of 4.5. Alternatively a citrate buffer could also be used. Preferably before treating the anionic material with the buffer, such anionic material is treated with alkali to remove any impurities. A 0.25 N sodium hydroxide solution is conveniently employed in a volume amount about equal to the volume of the anionic material. After passing the alkali through the bed of anionic material, such material is washed with water to a pH of about 8.0. Then the buffer is employed to obtain a pH of about 4.5 for the weak anionic ion-exchange material.

After the anionic ion-exchange material has been properly conditioned as described above, the aqueous glucose oxidase solution having a muddy-brown color is then contacted with said material. This can be conveniently accomplished by passing the aqueous solution through a bed of the weak anionic ion-exchange material. The anionic material adsorbs the glucose oxidase as well as catalase and other impurities. The aqueous medium flows through the bed and is discharged. Selective elution is then employed to separate the catalase and other impurities from the glucose oxidase. A buffer (preferably sodium acetate-acetic acid but citrate buffer could also be used) having a molar strength of about 0.07 to about 0.09 and a pH of about 4.3 to about 4.7 is passed through the bed of anionic material to wash out the catalase and other impurities. Preferably a buffer wash having molar strength of about 0.07 and pH of about 4.5 is employed. The catalase-containing impurity fraction is discharged from the bed of anionic ion-exchange material as a dark green solution.

The glucose oxidase is then selectively eluted from the anionic material by passing through the bed a buffer having a molar strength of about 0.095 to about 0.11 and a pH of about 3.5 to about 3.8. Preferably a buffer wash having a molar strength of about 0.1 and pH of about 3.7 is employed. The purified glucose oxidase fraction is discharged from the bed of anionic ion-exchange material as a clear yellow solution. An acetate buffer is preferably used but a citrate buffer could also be employed.

The simplified process of the present invention is useful not only to remove substantially all contaminating materials from glucose oxidase but also to purify the glucose oxidase without losing appreciable amounts of the glucose oxidase. The amount of glucose oxidase recovered is calculated by dividing the total activity of the product (glucose oxidase units/ml. times total ml.) with the total activity of the starting material (glucose oxidase units/ml. times total ml.). Recoveries of as high as about 91 percent have been achieved with the present process while removing substantially all the impurities. A glucose oxidase unit is well known in the enzyme art to represent the amount of glucose oxidase that will catalyze the oxidation of a glucose substrate containing 3.3 weight percent glucose monohydrate with 10 microliters of oxygen/min. at 35° C. and pH 5.1 over a 15 minute period.

The purified glucose oxidase obtained by the process of the present invention is especially useful in diagnostic tests for determining glucose in body fluids, such as blood and urine. It is also useful in all known applications for glucose oxidase.

The invention will be further described in the following examples.

Example 1

Mycelia obtained by fermentation of *Aspergillus niger* on a glucose substrate containing nutrients for such growth were ruptured and extracted with water. This aqueous liquid extract containing glucose oxidase was then mixed with ammonium sulfate in an amount of 90 percent of saturation to precipitate the glucose oxidase. The precipitate was separated by filtration and then dissolved in water. A 200 ml. portion of aqueous glucose oxidase solution thus prepared was dialyzed against running tap water at 10° C. for 21 hours to remove salts. A 275 ml. quantity of muddy-brown aqueous glucose oxidase solution was recovered. The aqueous solution was divided into two portions each about 136 ml. DEAE-Selectacel was washed to a pH of 4.5 with 0.05 M sodium acetate-acetic acid buffer at pH 4.5. One portion of the above aqueous glucose oxidase solution was passed into a column of the DEAE-Selectacel. DEAE-Sephadex was also washed to a pH of 4.5 with 0.05 M acetate buffer. The other portion of the aqueous glucose oxidase solution was passed into a column of the DEAE-Sephadex. Each column was treated as follows: 400 ml. of 0.07 M acetate buffer at pH 4.5 were passed through the column to elute the catalase and other enzymatic impurities; 0.1 M acetate buffer at pH 3.7 was then passed through the column to elute the purified glucose oxidase. A 198 ml. quantity of yellow purified aqueous glucose oxidase was obtained from the DEAE-Cellulose column and 118 ml. from the DEAE-Sephadex column. These yellow solutions indicated by their color that substantially all catalase had been removed. Assays for catalase content confirmed this conclusion.

Example 2

An aqueous glucose oxidase solution was obtained from *Aspergillus niger* mycelia followed by ammonium sulfate precipitation in the manner described in Example 1. This solution was dialyzed against running tap water at 10° C. for 7 hours to remove salts. A 50 ml. portion of the dialyzed material was adjusted to a pH of 4.5 with acetic acid. The solution was centrifuged to remove the precipitate which formed upon addition of the acetic acid. A bed of Duolite A-2 weak anionic ion-exchange material was washed with 0.05 M acetate to a pH of 4.5. Duolite A-2 is a phenolic secondary amine composition having chloride and sulfate anionic reactive sites. This bed consisted of particles about 10-50 mesh packed in a 2 cm. I.D. column to a depth of 17 cm. The supernatant liquid from the above centrifuge step was passed into the Duolite A-2 bed. After passing the aqueous glucose oxidase solution into the bed, a wash of 450 ml. of 0.07 M acetate buffer at pH 4.5 was passed through the bed to remove catalase and other contaminating materials. The purified glucose oxidase was selectively eluted from the resin bed with 0.1 M acetate buffer at pH 3.7 This clear yellow purified glucose oxidase had an activity of 410 glucose oxidase units/ml. and represented a recovery of 82.8 percent of the glucose oxidase activity. The purified glucose oxidase was substantially free of catalase.

*Example 3*

An aqueous glucose oxidase solution was obtained from *Aspergillus niger* mycelia followed by ammonium sulfate precipitation in the manner described in Example 1. A 100 ml. portion of this solution was dialyzed against running tap water at 10° C. for 7 hours to remove salts. The dialyzed product had an electrical resistance of 890 ohms/cm. This dialyzed material was adjusted to pH 4.5 with acetic acid. The solution was centrifuged to remove the precipitate which formed upon addition of the acetic acid. The supernatant liquid was then poured into a bed of Duolite A-2 anionic ion-exchange matterial. This bed consisted of particles about 10-50 mesh packed in a 2 cm. I.D. column to a depth of 12.5 cm. The bed previously had been washed with 0.05 M acetate buffer to a pH of 4.5 After passing the aqueous glucose oxidase solution into the bed, a wash of 550 ml. of 0.07 M acetate buffer at pH 4.5 was passed through the bed to remove catalase and other impurities. The purified glucose oxidase was selectively eluted from the resin bed with 0.1 M acetate buffer at pH 3.7 and was recovered in a clear yellow 92 ml. quantity having activity of 480 glucose oxidase units/ml. There was a recovery of 67 percent of the glucose oxidase activity.

*Example 4*

The procedure of Example 3 was repeated wherein a resistance of 1320 ohms/cm. was attained after dialysis and an 88.2 percent recovery of purified glucose oxidase resulted.

*Example 5*

An aqueous glucose oxidase solution was obtained from *Aspergillus niger* mycelia followed by ammonium sulfate precipitation in the manner described in Example 1. This solution was dialyzed against running tap water at 10° C. for 7 hours to remove salts. This dialyzed material was adjusted to pH 4.5 with acetic acid. The solution was centrifuged to remove the precipitate which formed upon addition of the acetic acid. A 150 ml. portion of the supernatant liquid was then poured into a bed of Duolite A-2 weak anionic ion-exchange material. This bed consisted of particles about 10-50 mesh packed into a 4 cm. I.D. column to a depth of 14 cm. The bed previously had been washed with an equal volume of 0.25 N sodium hydroxide to remove impurities, washed with water to pH 8.0 and then washed with 0.05 M acetate buffer to a pH of 4.5 After passing the aqueous glucose oxidase solution into the bed, the catalase and other impurities were selectively removed by successive washes of 550 ml. of 0.07 M acetate buffer at pH 4.5 and 350 ml. of 0.09 M acetate buffer at pH 4.5 The purified glucose oxidase was selectively eluted from the bed with 0.1 M acetate buffer at pH 3.7. The clear yellow purified glucose oxidase was recovered in an amount of 89.1 percent.

*Example 6*

An aqueous glucose oxidase solution was obtained from *Aspergillus niger* mycelia followed by ammonium sulfate precipitation in the manner described in Example 1. This solution was dialyzed against running tap water at 10° C. for 7 hours to remove salts. This dialyzed material was adjusted to pH 4.5 with acetic acid. The solution was centrifuged to remove the precipitate which formed upon addition of the acetic acid. The supernatant liquid was then poured into a bed of Amberlite IRC-50 weakly-acidic cation exchange material containing carboxylic cationic reactive sites. This material is marketed by Rohm and Haas Co. This bed consisted of particles about 10-50 mesh packed in a 2 cm. I.D. column to a depth of 17 cm. The bed previously had been washed with 0.05 M acetate buffer to a pH of 4.5. It was noted that some of the enzyme materials passed through the bed without being adsorbed. After passing the aqueous glucose oxidase solution into the bed, a wash of 0.07 M acetate buffer at pH 4.5 was passed into the bed. This eluted both the impurities and the glucose oxidase. This example clearly shows that cationic ion-exchange materials are not useful in the present invention for purification of glucose oxidase.

*Example 7*

An aqueous glucose oxidase solution was obtained from *Aspergillus niger* mycelia followed by ammonium sulfate precipitation in the manner described in Example 1. This solution was dialyzed against running tap water at 10° C. for 7 hours to remove salts. This dialyzed material was adjusted to pH 4.5 with acetic acid. The solution was centrifuged to remove the precipitate which formed upon addition of the acetic acid. A bed was prepared of Duolite A-101 strong anionic ion-exchange material containing quaternary ammonium anionic reactive sites. This material is marketed by Diamond Alkali Co. This bed consisted of particles about 10-50 mesh packed in a 2 cm. I.D. column to a depth of 17 cn. This bed was washed with 0.05 N acetic acid to a pH of 4.5. A 50 ml. quantity of the supernatant liquid from the above centrifuge step was adjusted to pH 4.5 and then passed into the column of the strong anionic ion-exchange material. A wash of 0.07 M acetate buffer at pH 4.5 was then passed into the bed to remove catalase and other impurities. The resulting effluent liquid contained catalase and also substantially all of the glucose oxidase. The bed was then washed with 0.1 M acetate buffer at pH 3.7. The resulting effluent contained only a trace of glucose oxidase. Similar results were obtained with Duolite A-102, another strong anionic ion-exchange material. This example clearly shows that strong anionic ion-exchange materials are not useful in the present invention for purification of glucose oxidase.

While the above examples employ glucose oxidase obtained from *Aspergillus niger* mycelia, it should be understood that glucose oxidase obtained from other known sources can be employed in the present invention to provide purified glucose oxidase.

In summary, the present invention resides in a process of producing purified glucose oxidase from fermentation mycelium which comprises treating aqueous mycelium extracts with ammonium sulfate to precipitate glucose oxidase, separating the precipitate and dissolving it in water, removing salts from the resulting aqueous solution, preferably by dialysis, then passing the solution into a bed of weak anionic ion-exchange material wherein the glucose oxidase and impurities are adsorbed, and then separating the purified glucose oxidase from the bed by selective elution. This simplified process enables, for the first time, aqueous glucose oxidase to be obtained at high recovery values substantially free of catalase and other impurities.

What is claimed is:

1. A process for the production of purified glucose oxidase which consists essentially of mixing aqueous mycelium material containing glucose oxidase and impurities including catalase with ammonium sulfate to precipitate the glucose oxidase, said ammonium sulfate being added to the aqueous mycelium material in an amount of at least about 85 percent of saturation, separating the glucose oxidase precipitate from the remainder of the aqueous mycelium material, dissolving the glucose oxidase precipitate in water, adjusting the pH of a weak anionic ion-exchange material to about 4.5, contacting the aqueous glucose oxidase solution with said weak anionic ion-exchange material wherein the glucose oxidase and impurities are adsorbed by the weak anionic ion-exchange material, washing the weak anionic ion-exchange material containing the glucose oxidase and impurities with a buffer having a molar strength of about 0.07 to about 0.09 and a pH of about 4.3 to about 4.7 to remove adsorbed catalase and other impurities from the weak anionic ion-exchange material and then washing the weak anionic ion-exchange material with a buffer having a molar strength of about 0.095 to about 0.11 and a pH of about 3.5 to about 3.8 to remove purified glucose oxidase from the weak anionic ion-exchange material.

2. A process according to claim 1 wherein dialysis against running water is employed to remove salts from the aqueous glucose oxidase solution prior to contacting the aqueous glucose oxidase solution with the weak anionic ion-exchange material.

3. A process according to claim 2 wherein the dialysis is carried out at about 5° C. to about 25° C. until the resistance of the aqueous glucose oxidase solution is at least about 890 ohms/cm.

4. A process according to claim 1 wherein the aqueous glucose oxidase solution is adjusted to a pH of about 4.5 to form an impurity precipitate and then said impurity precipitate is removed prior to contacting said solution with the weak anionic ion-exchange material.

5. A process according to claim 1 wherein the buffers used to separately remove the impurities and the purified glucose oxidase from the weak anionic ion-exchange material are acetate buffers.

6. A process according to claim 1 wherein an acetate buffer having a molar strength of about 0.07 and a pH of about 4.5 is employed to remove adsorbed catalase and other impurities from the weak anionic ion-exchange material.

7. A process according to claim 1 wherein an acetate buffer having a molar strength of about 0.1 and a pH of about 3.7 is employed to remove purified glucose oxidase from the weak anionic ion-exchange material.

8. A process according to claim 1 wherein the weak anionic ion-exchange material is a phenolic secondary amine composition having chloride and sulfate anionic reactive sites.

9. A process for the production of purified glucose oxidase which consists essentially of mixing aqueous mycelium material containing glucose oxidase and impurities including catalase with ammonium sulfate to precipitate the glucose oxidase, said ammonium sulfate being added to the aqueous mycelium material in an amount of at least about 85 percent of saturation, separating the glucose oxidase precipitate from the remainder of the aqueous mycelium material, dissolving the glucose oxidase precipitate in water, removing salts from the aqueous glucose oxidase solution by dialysis against running water at about 5° C. to about 25° C. until the resistance of the aqueous glucose oxidase solution is at least about 890 ohms/cm., adjusting the pH of the dialyzed solution to about 4.5 to form an impurity precipitate, removing said impurity precipitate from said dialyzed solution, adjusting the pH of a weak anionic ion-exchange material to about 4.5, contacting the dialyzed aqueous glucose oxidase solution with said weak anionic ion-exchange material wherein the glucose oxidase and impurities are adsorbed by the weak anionic ion-exchange material, washing the weak anionic ion-exchange material containing the glucose oxidase and impurities with an acetate buffer having a molar strength of about 0.07 and a pH of about 4.5 to remove adsorbed catalase and other impurities from the weak anionic ion-exchange material, and then washing the weak anionic ion-exchange material with an acetate buffer having a molar strength of about 0.1 and pH of about 3.7 to remove purified glucose oxidase from the weak anionic ion-exchange material.

10. A process according to claim 9 wherein the weak anionic ion-exchange material is a phenolic secondary amine compoistion having chloride and sulfate anionic reactive sites.

References Cited by the Examiner

Pazur, J. H. and Kleppe, K.: Biochemistry, vol. 3, No. 4, pages 578–583 (April 1964).

A. LOUIS MONACELL, *Primary Examiner.*

L. M. SHAPIRO, *Assistant Examiner.*